Figure 3:
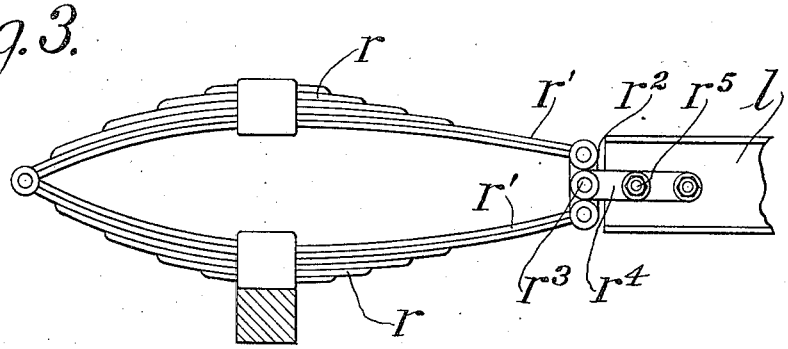

E. O. SUTTON.
MOTOR VEHICLE.
APPLICATION FILED MAY 26, 1913.
1,194,255.
Patented Aug. 8, 1916.
2 SHEETS—SHEET 1.
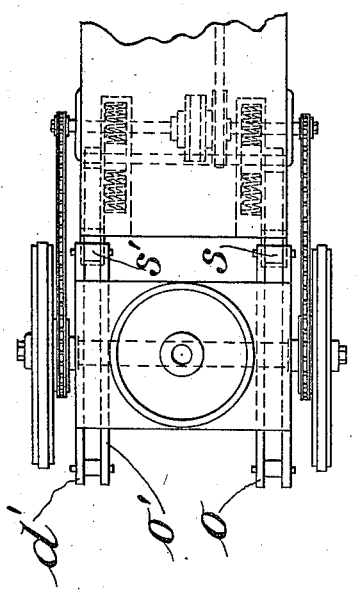
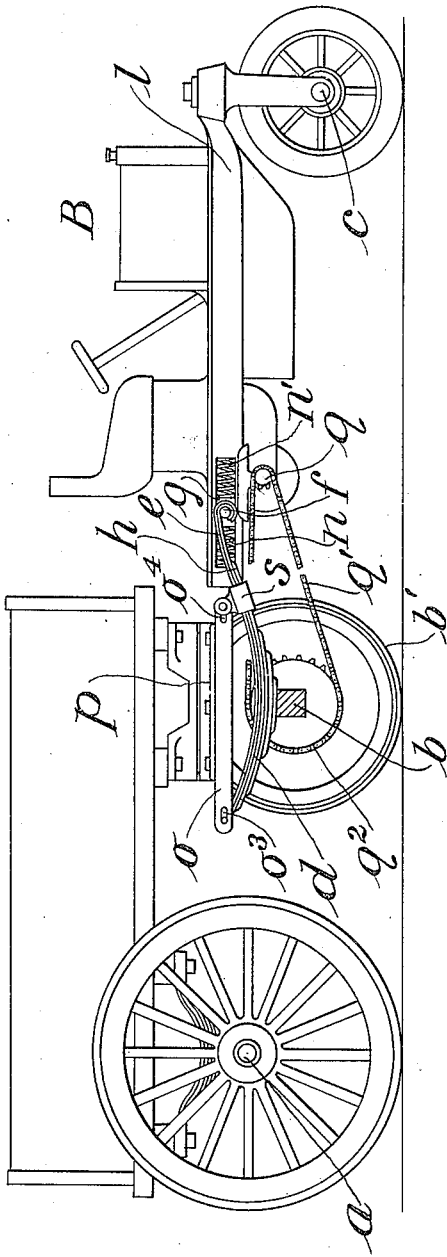
WITNESSES:
H. C. Hartwell.
Sebastian Hinton
INVENTOR.
Edward O. Sutton.
BY
Chapin Ley.
ATTORNEY.

E. O. SUTTON.
MOTOR VEHICLE.
APPLICATION FILED MAY 26, 1913.

1,194,255.

Patented Aug. 8, 1916.
2 SHEETS—SHEET 2.

WITNESSES:
H. C. Hartwell.
Sebastian Hinton

INVENTOR.
Edward O. Sutton.
BY
Chapin & Co.
ATTORNEY

UNITED STATES PATENT OFFICE.

EDWARD O. SUTTON, OF SPRINGFIELD, MASSACHUSETTS.

MOTOR-VEHICLE.

1,194,255.   Specification of Letters Patent.   Patented Aug. 8, 1916.

Application filed May 26, 1913. Serial No. 769,883.

*To all whom it may concern:*

Be it known that I, EDWARD O. SUTTON, a citizen of the United States of America, residing at Springfield, in the county of Hampden and State of Massachusetts, have invented new and useful Improvements in Motor-Vehicles, of which the following is a specification.

This invention relates to a motor vehicle of the tractor and trailer type, wherein is provided a tractor member carrying the motor and drawing a trailer member carrying the load. The most efficient form in which this combination has been developed at this time appears to involve only three supporting axles, the intermediate axle of which carries the driven wheels and may be considered either as the "fore axle" of the trailer or the "rear axle" of the tractor, the distinction being merely a matter of words. In a combination of this kind it is desirable, I have found, that the tractor and the trailer be supported substantially independently, for the reason that while very heavy springs may be required in general to support one thereof, if these springs are used to support the other an undue and undesirable vibration of the other may, in some cases, result. For example, if the springs are heavy enough to support the load, they are, frequently, too stiff for the tractor.

My invention comprises an arrangement whereby while the tractor and the trailer are supported from the same springs, thereby doing away with an excess of parts, nevertheless the tractor and the trailer are practically independently supported.

Another important feature of my invention resides in the fact that the draft from the tractor is communicated to the trailer through the intermediary of the supporting springs themselves and not through the intermediate axle of the combination. This means that the draft occurs in a horizontal line about intermediate the supporting axle and the trailer member, which means, in turn, that there is no tendency—such as has heretofore been always involved—to pull the intermediate axle out from under the trailer. The tractive force, according to my invention, is thus directed in an efficient and mechanically correct fashion, which makes for the easy operation of and less strain upon all of the connected parts. In addition, strut-rods or distance-rods, or their equivalents, are entirely eliminated, which results in a simplification of the structure and the elimination of considerable annoyance and inconvenience in practical operation.

Figure 4:
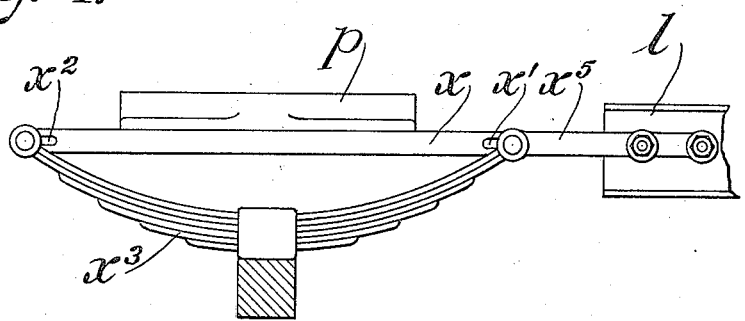
Figure 5:
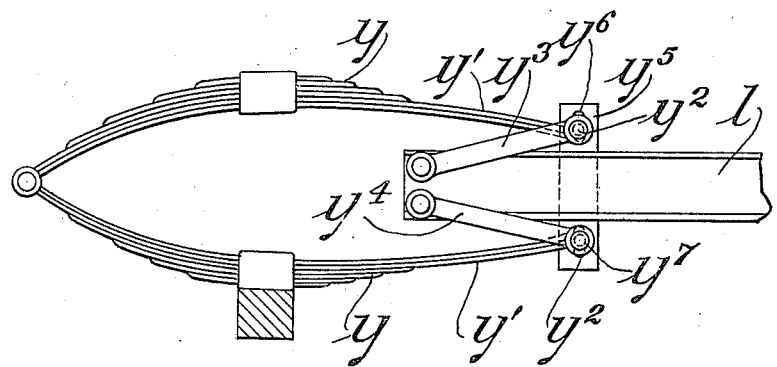

In the drawings, Figure 1 represents the tractor and trailer combination of my invention embodied therein in one of its forms; Fig. 2 is a top plan view of the details of Fig. 1; and Figs. 3, 4 and 5 are views of other modifications of the same invention.

A represents the trailer member and B the tractor member, it being immaterial in what precise form these members are made. The combination is supported on three axles, $a$, $b$, $c$. Upon the intermediate axle $b$ rests a semi-elliptic spring $d$, as shown in Fig. 1, this spring, in this modification, having some of its leaves prolonged at the front, as shown at $e$, and bent to engage a pin $f$ mounted upon a block $g$ sliding in slots $h$ in the tractor frame $l$. Upon either side of the block $g$ are stiff compression springs $n$ and $n'$ for a purpose hereinafter to be described. Mounted upon the spring $d$ and a corresponding spring $d'$, similar in all respects, at the opposite side of the frame, are a pair of strong cross-bars $o$ and $o'$ secured at their forward ends to the springs $d$ and $d'$ by the clamps $s$ and $s'$, as shown in Figs. 1 and 2. The parts $o$ are slotted, as shown at $o^3$ and $o^4$ (Fig. 1) to allow for play as the spring is depressed or rises under the influence of the load on the tractor. Bolted to the rods $o$ is a plate $p$ supporting the fifth wheel in an obvious manner. Mounted upon the tractor frame $l$ is the usual jack-shaft $q$ operating the sprocket chain $q'$ to drive the sprocket $q^2$ upon the wheels $b'$ on axle $b$. This sprocket-chain comprises the only connection between the tractor and the trailer, except the spring connection just detailed.

In operation, it is to be clearly seen that the entire tractive force of the tractor operates to pull the forward end of the springs $d$, or is resolved into a horizontal component substantially midway between the supporting axle $b$ and the fifth wheel of the trailer member, which is mechanically correct and makes for an easier action. In addition, the tractor member is supported practically independently of the trailer member, yet one pair of springs does the whole thing.

The purpose of the specific mounting $f$, $n$ and $n'$ will now be described. It is obvious that as a load is placed upon the trailer, the springs $d$ are flattened, which would tend to separate the tractor and the trailer members, thereby, if it were tight, possibly straining the sprocket-chain $q'$. In actual practice the slack of the sprocket-chain $q'$ would be entirely sufficient to accommodate this movement, but to make the device absolutely "fool proof" and incapable of being broken at this point, I have provided the compensating arrangement including the sliding block $g$ and the springs $n$ and $n'$, whereby the spring $d$ may take any position relative to the tractor frame without straining the sprocket-chain.

Figs. 3, 4 and 5 may be readily understood as being modifications of the same broad invention. In Fig. 3, the construction being otherwise the same, is shown a full elliptic spring $r$ with, in this instance also, a pair of prolonged leaves $r'$ connected to a link $r^2$ which carries at its mid-point a pin $r^3$ to which is connected a link $r^4$ connected at $r^5$ with the tractor frame $l$. In Fig. 4 is shown substantially the same construction as applied to a semi-elliptic spring. The mounting for the fifth wheel $p$ is carried on a pair of rods $x$ slotted at their extremities $x'$ and $x^2$ to accommodate pin connection with the spring $x^3$ of usual form, and connected, in turn, to the spring $x^3$ is a link $x^5$ carried by the tractor frame $l$. It is to be understood that members $x^5$ and $x$ may, if desired, be made together in one piece. In neither of the modifications illustrated in Figs. 3 and 4 are there compensating devices, as in actual practice it is believed that the arrangement will be quite practicable without such devices. Fig. 5, on the other hand, shows another modification with compensating devices, the springs $y$ in this modification having prolonged leaves $y'$ (though such prolonged leaves are not necessary) carrying pivotally mounted at their forward extremities the links $y^3$ and $y^4$, these links being pivotally connected at their rear ends with the tractor frame $l$, as shown. In addition, there is a slotted plate $y^5$ having slots $y^6$ and $y^7$ which embrace the rods $y^2$ connecting the front ends of the corresponding springs $y$ and upon which rods $y^2$ are mounted the links $y^3$ and $y^4$. It will be clearly seen that by this arrangement as the springs $y$ are depressed by the load the front ends $y'$ thereof will move forward and that the tractor frame $l$ will be carried back at the same time on the links $y^3$ and $y^4$ to an amount to substantially make up for the extension. The slotted plate $y^5$ is provided to prevent the tractor frame from turning the links $y^3$ and $y^4$ "inside out." It is to be understood, of course, that there is a slotted plate and similar links $y^3$ and $y^4$, together with similar members $y$, at the other side of the axle.

Having now described my invention, but recognizing that many changes and modifications may be made from the specific forms in which I have chosen here to illustrate it without departing from the scope of the invention, which is more truly bounded and defined by the claims hereto appended, I claim;

1. The combination in a tractor and trailer involving three supporting axles of a trailer frame, supporting springs on the intermediate axle for the trailer frame, integral extensions of said springs connected to said tractor and adapted to support the tractor member more yieldingly than the trailer frame is supported.

2. In a tractor and trailer device involving three supporting axles, springs on the intermediate axle to support the trailer, a portion of said springs being extended and connected to the tractor and adapted to more resiliently support the tractor than the trailer.

3. In a tractor and trailer mechanism involving three supporting axles, springs for the trailer having forward extensions, a tractor frame, and connections between the front ends of the springs and the tractor frame, said connections including blocks longitudinally slidable in the tractor frame and springs acting on said blocks to resist forward or backward movement whereby the extensions of the first named springs under their load may be substantially taken up without forcing the tractor and trailer members apart.

4. The combination in a motor device involving three supporting axles, of a spring for supporting the trailer upon the intermediate axle, a tractor frame, yieldable connections from the tractor frame to said springs, said connections comprising the draft connection between the tractor and the trailer.

5. In a motor vehicle involving three supporting axles, springs for supporting the trailer having forward extensions, a tractor frame, a member slidable in the tractor frame substantially longitudinally thereof but resiliently supported, and connections between the forward extensions of the spring and said member, together with a fifth wheel supported upon the said springs.

EDWARD O. SUTTON.

Witnesses:
SEBASTIAN HINTON,
MINNIE A. HINETER.